April 20, 1926.

M. I. MIX

GATE VALVE

Filed June 8, 1925

Inventor:
Martin I. Mix.

Patented Apr. 20, 1926.

1,581,654

UNITED STATES PATENT OFFICE.

MARTIN I. MIX, OF CHICAGO, ILLINOIS.

GATE VALVE.

Application filed June 8, 1925. Serial No. 35,521.

*To all whom it may concern:*

Be it known that I, MARTIN I. MIX, a citizen of the United States, residing at Chicago, in the county of Cook and State of Illinois, have invented a certain new and useful Gate Valve, of which the following is a specification.

My invention relates to gate valves adapted to control the flow of fluid, in liquid or gaseous form, in pipe lines.

Gate valves as heretofore constructed, consist mainly of a casing comprising a valve chamber having seats at the opposite ends thereof and a gate adapted to engage said seats to close the valve. The casing is provided with a bonnet on one side of the valve chamber to permit the gate to be completely withdrawn from the chamber by means of a hand operated screw stem extending through the bonnet and through a suitable packing box on the casing. The stem is ordinarily provided with a hand wheel at its outer end.

It is the general object of the invention to provide a new and improved gate valve with means to protect the threaded stem and bearing parts from corrosion.

It is a further object of the invention to provide a new and improved valve having a lubricant reservoir in the gate, surrounding the stem, and means on the valve casing to permit introduction of a lubricant to this reservoir.

Further objects and advantages of my invention will be understood from the following detailed description taken in connection with the accompanying drawings which form a part of this specification, in which—

Figure 1:
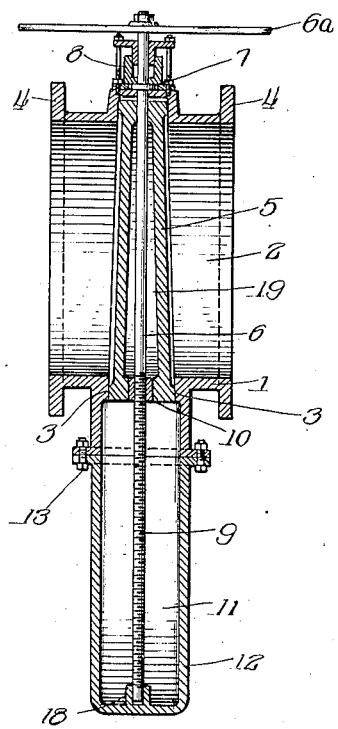
Figure 1 is a side view of one form of my invention in central section.

While my invention is susceptible of embodiment in many different forms, I have shown in the drawings and will herein describe in detail one such embodiment, with the understanding that the present disclosure is to be considered as an exemplification of the principles of the invention and is not intended to limit the invention to the embodiment illustrated. The scope of the invention will be pointed out in the appended claims.

Referring to the accompanying drawings, my invention in the exemplary form is shown as comprising a casing 1 having a channel 2 therethrough for the passage of a fluid. This casing has valve seats 3 surrounding the channel 2 and may be provided with the usual flanges 4 for attachment in a pipe line. A suitable gate, herein shown as a wedge shaped valve member 5 is adapted to coact with the seats 3 to close the channel 2.

Means is provided to open and close the gate 5, said means as shown herein comprising a rotatable stem 6 having a hand wheel $6^a$ thereon, said stem being prevented from moving longitudinally by a thrust bearing 7 at its outer end secured in a suitable packing box attached to the casing and herein designated generally as 8. A threaded portion 9 of the stem 6 engages a nut 10 secured at the bottom of the gate 5, the rotation of said stem thereby operating said gate.

The casing 1 is T shaped, having in addition to the channel 2 a recess 11 on the side of said channel opposite the thrust bearing 7, said recess being herein shown as formed by a housing 12 suitably attached to the casing 1 as by bolts 13. This housing 12, which serves as a receptacle for any sediment or foreign matter when the valve is in its normal position, as well as to enclose the gate when the valve is open, is provided with openings such as 14 and 15, having suitable closures, to permit convenient draining and flushing out of such sediment or matter. The casing 1 is preferably provided with vertical guide ribs 16 forming tongues adapted to engage in suitable grooves 17 in the gate 5 so as to guide the gate in its reciprocatory path into and out of engagement with the seats 3. At the bottom of the casing there is provided a socket 18 to act as a lower bearing for the stem 6.

Figure 2:
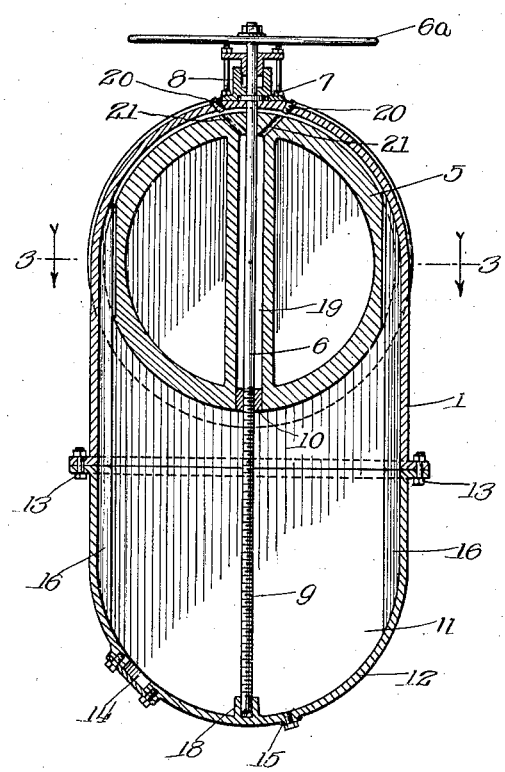
Figure 2 is a sectional view taken along the line 2—2 of Fig. 1 looking in the direction of the arrows.
Figure 3:
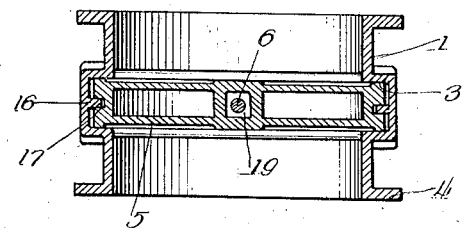
Fig. 3 is a sectional view taken along the line 3—3 of Fig. 1 looking in the direction of the arrows.

The gate 5 has a cavity 19 surrounding the stem 6, which is adapted to contain a lubricant to lubricate the stem 6 and nut 10, and thereby prevent corrosion thereof. Suitable ducts 20 and 21 are provided in the casing 1 a d gate 5 respectively so as to register when the gate is in its uppermost position as shown in Fig. 2, and thus permit a lubricant to be fed into the cavity 19.

It will be seen that the recess below the channel provides for the collection of any sediment or foreign matter so that it does not interfere with the proper operation of the valve, and such sediment may easily be removed when desired without removing the valve from the pipe line. This position of the recess also permits the hand wheel to be positioned immediately adjacent the fluid channel, thereby requiring but little head room for vertical operation of the valve and permitting vertical operation in practically all applications. The stem is in tension when the valve is being closed and therefore is incapable of buckling. Also it will be observed, the stem is, in effect, shortened to about one half its normal length at the moment of greatest strain in that only the portion of the stem between the nut 10 in the gate and the thrust bearing 7 is in tension to completely close the valve or in compression to begin to open it.

I claim as my invention:

1. A gate valve having, in combination, a casing with a channel therethrough, a seat surrounding said channel, a valve member operable to engage said seat to close said channel, said casing having a recess on one side of said channel into which said valve member may be completely withdrawn from the channel, a valve stem adapted to operate said valve member, said valve stem being supported in said casing at a point opposite said recess for rotational movement and means to lubricate said stem comprising a reservoir formed in said valve member and surrounding said stem and a duct formed in said casing adapted to connect with said reservoir.

2. A gate valve having, in combination, a casing having a channel therethrough, a valve member adapted to close said channel, said casing having a recess on one side of said channel into which said valve member may be completely withdrawn from said channel, a valve stem adapted to operate said valve member, said valve member being constructed to form a reservoir surrounding said stem adapted to contain a lubricant, and means in said casing adapted to permit introduction of a lubricant into said reservoir when said valve is in its closed position.

In testimony whereof, I have hereunto affixed my signature.

MARTIN I. MIX.